United States Patent
Gandhi

(10) Patent No.: US 7,489,089 B2
(45) Date of Patent: Feb. 10, 2009

(54) COLOR CONTROL SYSTEM FOR COLOR CHANGING LIGHTS

(76) Inventor: Samir Gandhi, 5500 Barnard St., Simi Valley, CA (US) 93063

( * ) Notice: Subject to any disclaimer, the term of this patent is extended or adjusted under 35 U.S.C. 154(b) by 53 days.

(21) Appl. No.: 11/228,062

(22) Filed: Sep. 16, 2005

(65) Prior Publication Data

US 2007/0064419 A1  Mar. 22, 2007

(51) Int. Cl.
H05B 37/02 (2006.01)
(52) U.S. Cl. .................. 315/291; 315/294; 315/302; 315/129
(58) Field of Classification Search .......... 315/129, 315/130, 132, 291, 307, 294, 312, 299, 300, 315/302
See application file for complete search history.

(56) References Cited

U.S. PATENT DOCUMENTS

| | | | |
|---|---|---|---|
| 5,420,482 A | 5/1995 | Phares | |
| 6,016,038 A | 1/2000 | Muller et al. | |
| 6,150,774 A | 11/2000 | Muller et al. | |
| 6,340,868 B1 | 1/2002 | Lys et al. | |
| 6,348,766 B1 * | 2/2002 | Ohishi et al. | 315/200 A |
| 6,528,954 B1 | 3/2003 | Lys et al. | |
| 6,801,003 B2 * | 10/2004 | Schanberger et al. | 315/291 |
| 6,806,659 B1 | 10/2004 | Muller et al. | |
| 7,038,399 B2 * | 5/2006 | Lys et al. | 315/291 |
| 7,106,378 B2 * | 9/2006 | Kawakami | 348/371 |
| 7,180,252 B2 * | 2/2007 | Lys et al. | 315/312 |
| 7,186,000 B2 * | 3/2007 | Lebens et al. | 362/184 |
| 2002/0047628 A1 | 4/2002 | Morgan et al. | |
| 2004/0207334 A1 | 10/2004 | Lin | |
| 2005/0174473 A1 * | 8/2005 | Morgan et al. | 348/370 |

* cited by examiner

Primary Examiner—Douglas W. Owens
Assistant Examiner—Ephrem Alemu
(74) Attorney, Agent, or Firm—The Patel Law Firm, P.C.; Natu J. Patel

(57) ABSTRACT

A system and method for color changing lighting comprising a pre-programmed controller along with driver circuit, a single or combination of LEDs and an OFF/ON switch which is used for making selection of mode of operation as well as switching the system ON/OFF. Brightness is changed using pulse width modulation. The LED's are selectively activated by programmed variable pulse to generate desired color mixing effect. The resulting illumination may be controlled by a computer/micro-controller program to provide pre-designed complex patterns of light in virtually any environment.

3 Claims, 8 Drawing Sheets

COLOR CONTROL SYSTEM FOR COLOR CHANGING LIGHTS

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF INVENTION

This invention generally relates to Light Emitting Diodes (LED) lighting systems, and more specifically to a method and apparatus of controlling one or more LED lights in order to provide different colors, and still more precisely to provide different colors, achievable by the system, to the individual LED or combination thereof by digital programming and a time sensitive on-off switching method.

BACKGROUND OF THE INVENTION

LEDs are commonly used in lighting applications, and have in many areas superseded conventional lighting, including decorative elements, indicators etc. LEDs have various advantages: they are cost effective, easy to implement and typically consume very little power. Furthermore, LEDs may be employed to produce a lighting system with a varying color scheme, which is often desired for applications such as lamps, back light sources, traffic signals, display boards, illuminating switches and commercial lighting. LEDs provide the best option for these applications as they are easily available in basic colors Red, Green and Blue (RGB) and any other colors can be produced by manipulating the intensity of these basic colors RGB.

U.S. Patent publication number US 2004/0207334 discusses a system for a color changing bulb for the instrument panel of a vehicle, which is made as a bulb and directly installable in a bulb seat of the instrument panel. The color changing bulb includes a bulb housing defining a receiving space for receiving a light emitting diode and a circuit board. The LED includes three LED chips for generating red, blue and green light components. A controlling circuit is disposed on the circuit board and connected with the LED for driving the three-color LED chips to emit light. By use of a brightness adjustment switch on the instrument panel or a headlight switch, at least seven combinations of colors of light can variably emitted. This patent provides a memory unit to store or count the number of times the headlight switch is switched to create additional signal indicating which color the LED system should produce. This system is further using stabilizing unit and a digital cycle outputting unit, which makes it limited to only cyclic color changes and does not provide with an option for selecting a single color and the system can not be programmed for selecting flashing or steady state color mode.

In another US Patent publication, number US 2002/0047628, a system is discussed which is more complicated and requires a more complex infrastructure to control and use the system, making it both bulky and costly. This art is used in larger applications such as in decorating retail, commercial and residential places; thus limiting this system to outdoor environments. It is not cost-effective in smaller applications.

In another U.S. Pat. No. 5,420,482, a color display apparatus is disclosed in which each of the three color LED in the circuit are driven by transistor biasing. In this system, each transistor base is coupled to a respective latch resistor. As the three latches are connected to a single data bus, it becomes impossible to change the color of all the three LED's at a very high speed. Also, the biasing of the transistor was changed by simply changing the grounding resistor of the potential divider which may vary from piece to piece due to component tolerance.

U.S. Pat. No. 6,016,038 to Mueller, et al. discloses a pulse width modulated current control for an LED lighting assembly, where each current-controlled unit is uniquely addressable and capable of receiving illumination color information on a computer lighting network. The light module is adapted to be conveniently interchanged with other light modules having programmable current and hence maximum light intensity, ratings. The pulse width modulated LED lighting assembly of this invention however necessitates the use of a computer controller to operate the system.

U.S. Pat. No. 6,150,774, also to Mueller, et al. discloses a similar pulse width modulated current control for an LED lighting assembly wherein each current-controlled unit is uniquely addressable and capable of receiving illumination color information on a computer lighting network. This patent anticipates the use of a manual control for an LED lighting assembly, however there is no method for manually programming an LED light source with such a method.

U.S. Pat. No. 6,211,626 to Lys, et al. discloses a light module, comprising an LED system for generating a range of colors within a color spectrum, a processor for controlling the amount of electrical current supplied to the plurality of light emitting diodes, so that a particular amount of current supplied thereto generates a corresponding color within the color spectrum, a housing within which the LED system is positioned, and a heat spreader plate in contact with the housing for dissipating heat from the housing; wherein the LED system includes a thermal connection to the heat spreader plate. This invention fails to provide for a manual, switched color or color array setting mode.

U.S. Pat. No. 6,340,868 to Lys, et al. discloses a light module having a plurality of light emitting diodes for generating light of a range of colors within a color spectrum, a processor for controlling the amount of electrical current supplied to each light emitting diode such that a particular amount of current supplied to the light module generates a corresponding color within the color spectrum, and a power module for providing electrical current from a power source to the light module, the power module including a connector for removably and replacably connecting the power module to the light module. However, this invention contemplates a computer controlled multicolored lighting network, rather than individual lighting units which may be programmed to multiple modes in a series by a manual switch.

U.S. Pat. No. 6,528,954 to Lys, et al. also relates to LED lighting assemblies, however this patent claims the use of a processor to control current through the LEDs, rather than a technique to control pre-programmed modes through a manual switch.

U.S. Pat. No. 6,806,659 to Mueller, et al. discloses a pulse width modulated current control for an LED lighting assembly, wherein each current-controlled unit is uniquely addressable and capable of receiving illumination color information on a computer lighting network. In a further embodiment, the invention includes a binary tree network configuration of lighting units (nodes). In another embodiment, the present invention comprises a heat dissipating housing, made out of a heat-conductive material, for housing the lighting assembly.

The heat dissipating housing contains two stacked circuit boards holding respectively the power module and the light module. The light module is adapted to be conveniently interchanged with other light modules having programmable current, and hence maximum light intensity, ratings. Like the other background references, this invention doesn't contemplate an LED lighting assembly, wherein the ON/OFF switch is also the color control.

The above mentioned prior art does not provide choice of selection of cyclic or steady state color modes. Although several instances of the prior art have the capability of generating a variety of combinations, they lack the ability to make color changes without large, costly, complex controllers, and are not suitable for use in small applications. Furthermore, these arts do not provide any memory means to store a mode of operation and color or color combination when they are switched off, to restore a variety of predetermined settings at the time of the next restart.

OBJECT OF THE INVENTION

Therefore it is one object of the invention is to provide a light emitting diode system.

It is a further object of the present invention to provide choices of flashing or steady state color selection of lighting of LEDs.

A further object of the present invention is to reduce the complexity of the system, and to make the system comparatively cost effective, small, intelligent and efficient.

Yet another object of this invention is to simplify the selection process of flashing or steady state light operation, within a stipulated time limit, so that anyone, irrespective of age or knowledge, can use the system effectively.

Still another object of the present invention is to provide with a memory means to store the system's mode of operation and display color, and to restore a variety of predetermined settings at the time of a subsequent system restart.

SUMMARY OF THE INVENTION

The present invention comprises a system and method for color changing lighting, having a pre-programmed controller with driver circuit, single or combination of LEDs and an OFF/ON switch which is used for making a mode of operation selection as well as switching the system on and off. The brightness of the LED or combination of LEDs is changed using pulse width modulation.

This system is capable of working on a regulated or unregulated power supply and the drive circuit of the system is provided with an external resistor to set the drive current for different LED arrays and it keeps equal current in each leg of LEDs in varying forward voltage with the help of transistors. The LED's are selectively activated by programmed variable pulses to generate the desired color mixing effect. The controller controls the lighting mode and color of said LEDs, it uses 8 bits of data in the presented embodiment, to provide maximum of 256 intensity levels per LED, thereby giving a smooth transition from one color to other.

The controller uses an external crystal which allows all light modules in the system to be synchronized, and is capable of storing the mode and color (or combination of colors) at the time it is switched off. In an alternate embodiment, an internal oscillator may be used for synchronization; however the preferred mode uses an external crystal for accuracy. The system provides options for selecting one mode of two different modes of operation; namely rotating color mode and fixed color mode.

When the system is initially powered on, a user may select from a variety of color modes. A user can switch from mode to mode by turning the power off and on within a first predetermined time, called the "switching time." In the present embodiment, for purposes of illustration, a period of 5 or less is proposed. All mode switching operations must be completed within a second predetermined time, called the "synchronize time." For purposes of illustration, a period of 10 seconds is proposed. Each time the power is turned off and on in under five seconds, from the first time the power is turned on until the end of the synchronize time at ten seconds, it starts in a new mode. To select a mode, a user simply leaves the system on until the end of the synchronize time.

Each mode is characterized by either a changing, selectable or static light pattern of one or a variety of colors, and each mode has a corresponding indicator pattern that is displayed by the LEDs of the system during the synchronize time. When the synchronize time ends, the LEDs go from displaying the indicator pattern to either a color changing cycle or static color of the mode selected.

For instance, in a system with standard red green and blue LEDs, when the power is initially switched on, a green LED may blink to indicate a first (default) mode. If the power is turned off for less than five seconds and back on again, a red blinking LED may be used to indicate that the system has switched to a second mode. If the power is then turned off a third time and back on within five seconds, the system goes into a third mode, reflected perhaps by a blue LED indicator.

If the mode is switched again after the last selectable mode, it cycles back to the first (default) mode. At the end of the synchronize time, the system goes into the mode selected. If the power is switched off and on in under five seconds once the synchronize time is over and the system has switched into a particular mode, the system restarts at the beginning of a new synchronize time in the first (default) mode.

The number of modes is only limited by the possible combinations of static or blinking colors or combinations of colors of LEDs, and each mode may be characterized by different characteristics, such as a constantly changing color pallet, a changing color pallet that remembers the final color selected and stays there, or a pallet that moves between two selected colors, etc.

If a mode is selected that is characterized by a static color, That color will be displayed each time the system is turned on, as long as the interval between powering off and back on is more than the switching time (in the present embodiment, 5 seconds). If the system is turned off and on in less than the switching time, it reverts to the first default mode and a new synchronize time starts. If a color changing mode is selected, once the synchronize time ends, the system goes into that mode's color changing cycle.

A color changing cycle cycles through all or a range of the system's possible colors in a predetermined time. In one embodiment, it may take 60 seconds to cycle through all of the colors of a system. The range of possible colors in a particular cycle depends on the characteristics of the mode. For instance, one color changing mode may cycle through all possible colors. A second color changing mode may be limited to colors between orange and purple, etc. The number of modes is limited only by the number of combinations of colors, and blinking rates possible in the LED array. While not infinite, a very large number of modes are possible in any given system.

Color changing modes may be either continuous, or selectable. A continuous color changing mode constantly cycles through its range of colors. When the system is powered off for a period greater than the switching time (5 seconds in the present embodiment), once it is powered on again, the color continues to cycle starting from any predetermined position, including the last color displayed before the power was turned off.

By contrast, a selectable color cycle cycles through a range of colors just like a continuous cycle. However, when a selectable cycle is powered off for a period greater than the switching time, it retains the last displayed color as a static color once it is powered on again, and retains that color until the system is reset by powering off and on in a period less than the switching time.

REFERENCE NUMERALS

1 . . . User Interface
3 . . . Microcontroller
5 . . . LED Drivers Geen, Red and Blue
7 . . . Single or Combination of Green, Red, Blue LEDs
9 . . . Ground
11 . . . Power Supply Block
13 . . . User Interface Block
15 . . . Power Regulator Block
17 . . . Controller Block
19 . . . LED Board
21 . . . Power ON Test Block
23 . . . Selection (synchronize time or switching option mode) Block
25 . . . Cyclic/rotating Color Mode Block
27 . . . Fixed Color Mode Block
60 . . . Input Supply
62 . . . Bridge Rectifier
64 . . . Switching Regulator
66 . . . Linear Regulator
68 . . . Voltage Detector
70 . . . Microcontroller
72 . . . Crystal
74 . . . LED Driver
76 . . . Schottky Diode
78 . . . Inductor
80 . . . Ground Node
82 . . . Electrolytic Capacitor
84 . . . Resistor
86 . . . Transistor
88 . . . Diode
90 . . . Ceramic Capacitor

DETAILED DESCRIPTION

A further understanding of the present invention may be obtained with reference to the following description taken in conjunction with the accompanying drawings. However, the embodiments used for describing the invention are illustrative only and no way limiting scope of the invention. A person skilled in the art will appreciate that many more embodiments of the invention are possible without deviating from the basic concept of the invention any such embodiment will fall under the scope of the invention and is a subject matter of protection.

Figure 1:
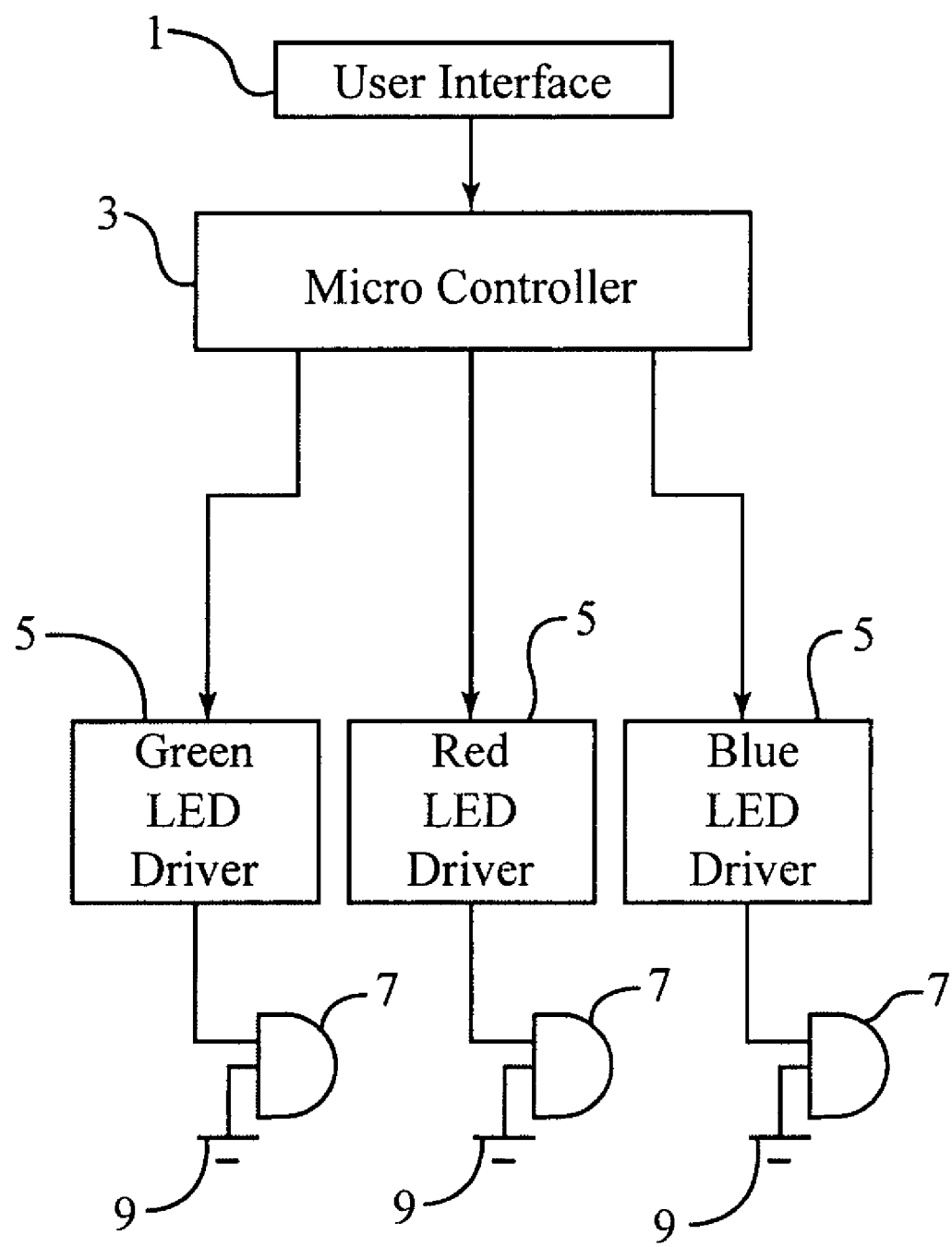
FIG. 1 shows a basic block diagram of the presented work.

FIG. 1 shows a basic block diagram of the presented work, the user interface 1 gets the ON/OFF input and sends it to the micro-controller 3 which drives the LED Drivers 5. The driver circuit drives single or combination of red, blue and green lighting devices or LED's 7, which are used as the light source, and according to the inputs and micro-controllers signals, the LED's emit light.

Figure 2:
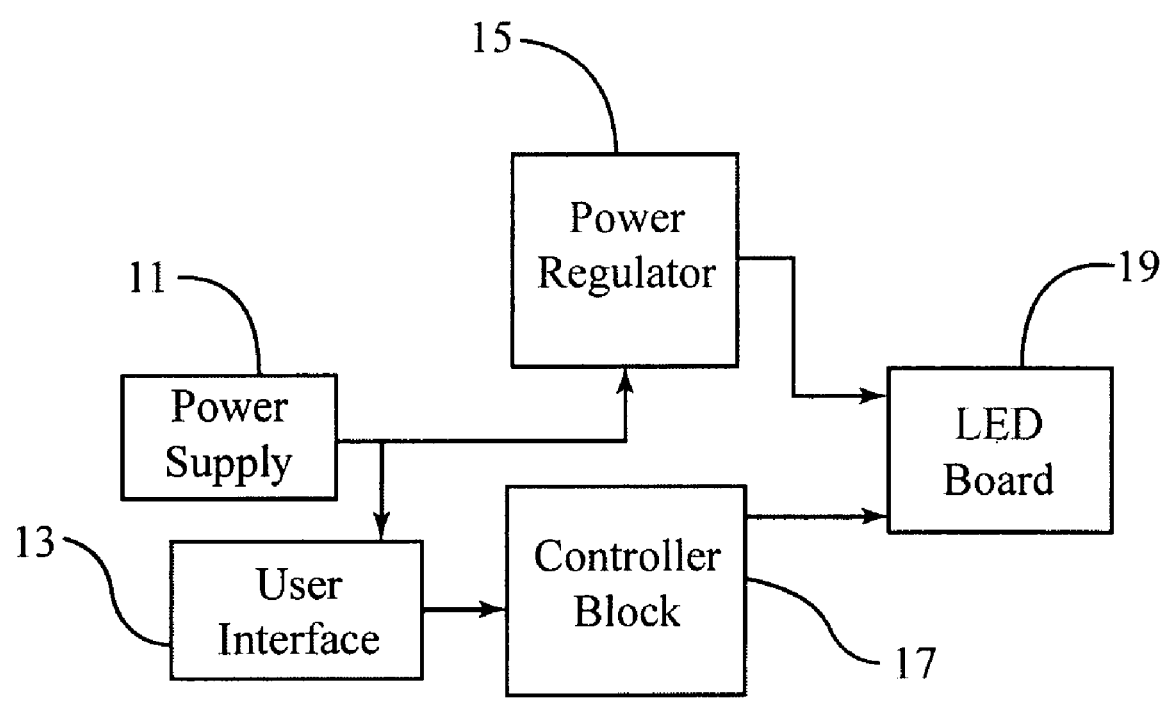
FIG. 2 shows a simple block diagram of the circuit.

FIG. 2 shows a simple block diagram of the circuit presented which consists of power supply 11, user interface 13, power regulator block 15, controller block 17 and LED board 19. When the power supply 11 is on and there is an input at user interface 13, the controller block 17 sends control signals to the LED board 19 according to the function selected. The LED board 19 receives the regulated power from the power regulator block 15 for the proper LED output.

Figure 3:
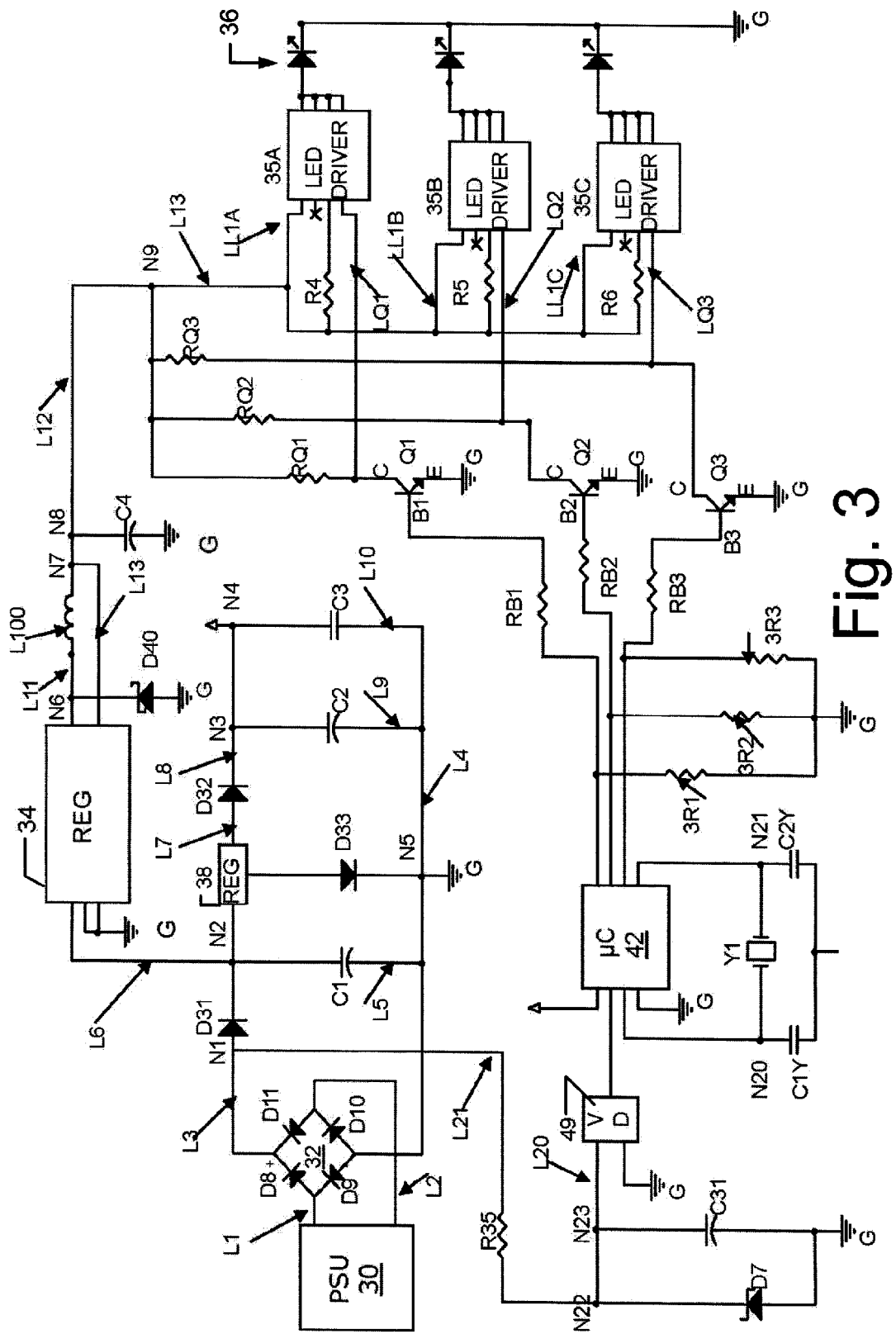
FIG. 3 shows circuit diagram of color changing system.

FIG. 3 shows a circuit diagram of the present invention which is designed to operate on low voltage. It contains a power supply unit (PSU) 30 with a 2 point connector that receives the 12 V AC input from the step down transformer (not shown in the figure). The bridge assembly consisting of rectifier diodes D8, D9, D10, D11 which convert the AC into a pulsating DC signal. This signal is then fed to the power regulator section which regulates the voltage to 5 V LED driver circuit. Although a 5 V LED driver circuit is contemplated in this example, the present invention also contemplates a range of line voltages from any regulated or unregulated power supply.

Filter capacitors C1, C2, C3, C4 and linear 5 V regulators (REGs) 38 and 34 (LM7805 and LM 2576 in the present example) are used for high current application. The pulsating DC signal is applied to the user interface which senses the switch ON/OFF time period and changes the state of the light accordingly. The Zener diode D7 keeps the input signal to the voltage detector (VD) 49, MCP100, at fixed level when power is on at 5.1 V. The output of the voltage detector (VD) 49, MCP100, changes to low as soon as the power is off, and provides active low switch input for the micro-controller (μC) 42. The user interface provides input to the micro-controller (μC) 42, PIC12F629. The micro-controller (μC) 42 communicates with the user using pin number 4 to detect a power fail. The micro-controller (μC) 42 runs at 8 bits so that 256 possible voltage levels for can be achieved. Thus 256 current values and equivalent levels of intensity per LED are achieved. An external crystal Y1 provided with the micro-controller (μC) 42 synchronizes all light modules.

The digital signal from pins 5, 6, 7 control the intensity of R,G,B LEDs (LED diodes) 36 respectively by turning on and off LED drivers 35A, 35B, and 35C chips, using transistors Q1, Q2 and Q3. An external resistor allows the circuit designer to set the drive current for different LED arrays. It also supplies constant current for varying input voltage. External resistors R4, R5, R6 allow current to be set, upto 350 mA of each leg of distinct color LEDs (LED diodes). The control card which uses IC's (for LED drivers 35A, 35B, and 35C) numbered NUD 4001 connects with the LED board where the color changing LED diodes 36 or combination of LEDs (LED diodes) are connected.

In FIG. 3, PSU 30 includes line L1 connected to a bridge rectifier 32 between an anode of diode D8 and a cathode of diode D9 and a second line L2 connected between a cathode of diode D10 and anode of diode D11. Line L3 is coupled between cathodes of diodes D8 and D11 to an anode of diode D31. The anode of diode D31 is coupled to node N1 in line L3. The cathode of diode D31 is coupled to REG 38. Node N2 is placed between REG 38 and the cathode of diode D31. Line L4 is coupled to bridge rectifier 32 between anodes of diodes D9 and D10. Line L4 includes a node N5, where node N5 is connected to ground G. Node N5 is hereinafter referred to as a "ground node N5."

Line L5 extends between node N2 and line L4. An anode of capacitor C1 is connected to node N2 and a cathode of capacitor C1 is connected to line L4 and, hence, ground node N5. Line L6 connects to and extends between REG 34 and node N2.

Line L7 is coupled to an anode of diode D32 and REG 38. A cathode of diode D32 is coupled to node N3 in line L8. Line L9 extends between node N3 and line L4. An anode of capacitor C2 is coupled to node N3. A cathode of capacitor C2 is connected line L4 and, hence to ground node N5. Line L8 extends between the cathode of diode D32 and node N4. Line L10 extends between node N4 and line L4. Line L10 includes capacitor C3 having one side connected to line L4 and, hence, ground node N5. The other side of capacitor C3 is connected to node N4. REG 38 is also coupled to an anode of diode D33. The cathode of diode D33 is coupled to line L4 at ground node N5 in line L4.

At voltage regulator kEG 34, two additional leads or lines on an input side of REG 34 are coupled to ground G. Lines L11 and L13 are shown as extending from an output side of REG 34. Line L11 includes inductor L100. Between REG 34 and one side of inductor L100 is node N6. A cathode of a Schottky diode D40 is coupled to node N6, where node N6 is between kEG 34 and inductor L100. The anode of Schottky diode D40 is coupled to ground G. Line L13 extends from REG 34 to the other side of the inductor L100 at node N7. Line L12 has node N8. Node N8 has an anode of capacitor C4 coupled thereto. The cathode of capacitor C4 is coupled to ground G.

Line L12 also includes node N9. Node N9 has the collectors C of transistors Q1, Q2 and Q3 coupled thereto through resistors RQ1, RQ2, RQ3, respectively, in the collector paths of transistors Q1, Q2 and Q3. The emitters E of transistors Q1, Q2 and Q3 are coupled to ground G. The collectors C of transistors Q1, Q2 and Q3 are also coupled to a respective different one LED Driver 35A, 35B and 35C via lines LQ1, LQ2 and LQ3 where LQ1, LQ2 and LQ3 are coupled to one side of the resistors RQ1, RQ2, RQ3, respectively. The other side of each of the resistors RQ1, RQ2, RQ3 is coupled node N9. From node N9 extends line L13. From line L13 extends line LL1A to the LED Driver 35A; line LL1B to LED Driver 35B; and line LL1C to LED Driver 35C. From Line L13 extends a line to the LED Driver 35A having resistor R4; a line to LED Driver 35B having resistor R5; and a line to LED Driver 35C having resistor R6.

The other side of each of LED Driver 35A, LED Driver 35B, and LED Driver 35C is coupled to a respective different one of the LED diodes 36, where the LED diodes 36 are coupled to ground G. Returning again to the bases of transistors Q1, Q2 and Q3, base B1 of transistor Q1 has one side of resistor RB2 coupled thereto; base B2 of transistor Q2 has one side of resistor RIB2 coupled thereto; and base B3 of transistor Q3 has one side of resistor RB3 coupled thereto. The other side of each resistor RB1, RB2, RB3 is coupled to a respective different one of first, second and third outputs of micro-controller 42.

A plurality of resistors 3R1, 3R2 and 3R3 all have one side thereof coupled to ground G. The other side of resistor 3R1 is coupled to said other side of resistor RB1 between resistor RB1 and the first output of micro-controller 42. The other side of resistor 3R2 is coupled to said other side of resistor RB2 between resistor RB2 and the second output of micro-controller 42. The other side of resistor 3R3 is coupled to said other side of resistor RB3 between resistor RB3 and the third output of micro-controller 42.

The micro-controller 42 is coupled to ground G. The micro-controller 42 is coupled to one side of crystal Y1 at node N20 and the other side of crystal Y1 at node N21. Nodes N20 and N21 are connected to micro-controller 42. One side of capacitor C1Y is coupled to one side of capacitor C2Y. The other side of capacitor C1Y is coupled to node N20. The other side of capacitor C2Y is coupled to node N21.

Voltage detector (VD) 49 has an input side and an output side. The output side of VD 49 has a lead coupled to the micro-controller 42. The VD 49 is coupled to ground G. Additionally, another line L20 from the input side of VD 49 is coupled to a cathode of Zener diode D7 at node N22. The anode of Zener diode D7 is coupled to ground G. Between node N22 and VD 49 is node N23. Capacitor C31 has one end coupled to ground G and the other end coupled to node N23. Line L21 extends from node N22 to node N1 in line L3. In the path of line L21 is resistor R35.

Figure 4:
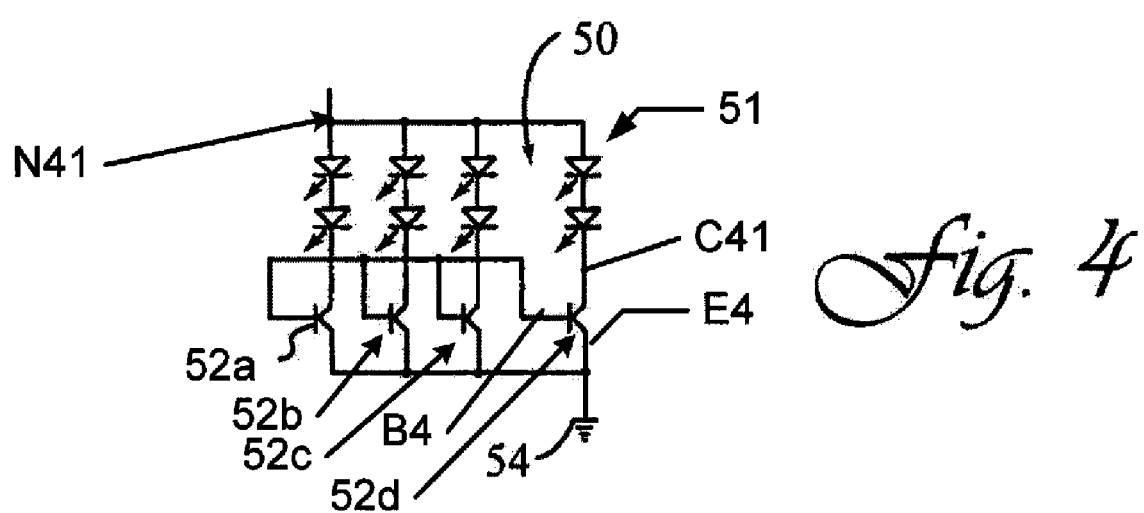
FIG. 4 shows the electrical circuit for LED board.

FIG. 4 shows the electrical circuit of the LED boards used in the present embodiment. In the circuit diagram, one LED each of red, blue and green or an array 50 of green, blue and red LED's are used as the light source. This LED board design is such that despite variations in forward voltage from different LEDs, the current remains equal in each LED or LED array 50 with the help of the transistors 52a, 52b, 52c and 52d in the LED board 19.

FIG. 4 illustrates an array 50 with four transistors 52a, 52b, 52c and 52d. The base B4 of each transistor 52a, 52b, 52c and 52d is coupled to each other. The emitter E4 of each transistor 52a, 52b, 52c and 52d is coupled to ground 54. Each collector C41 has coupled thereto a different pair of series coupled LED diodes 51. Node 41 receives an input to LED diodes 51.

Figure 5:
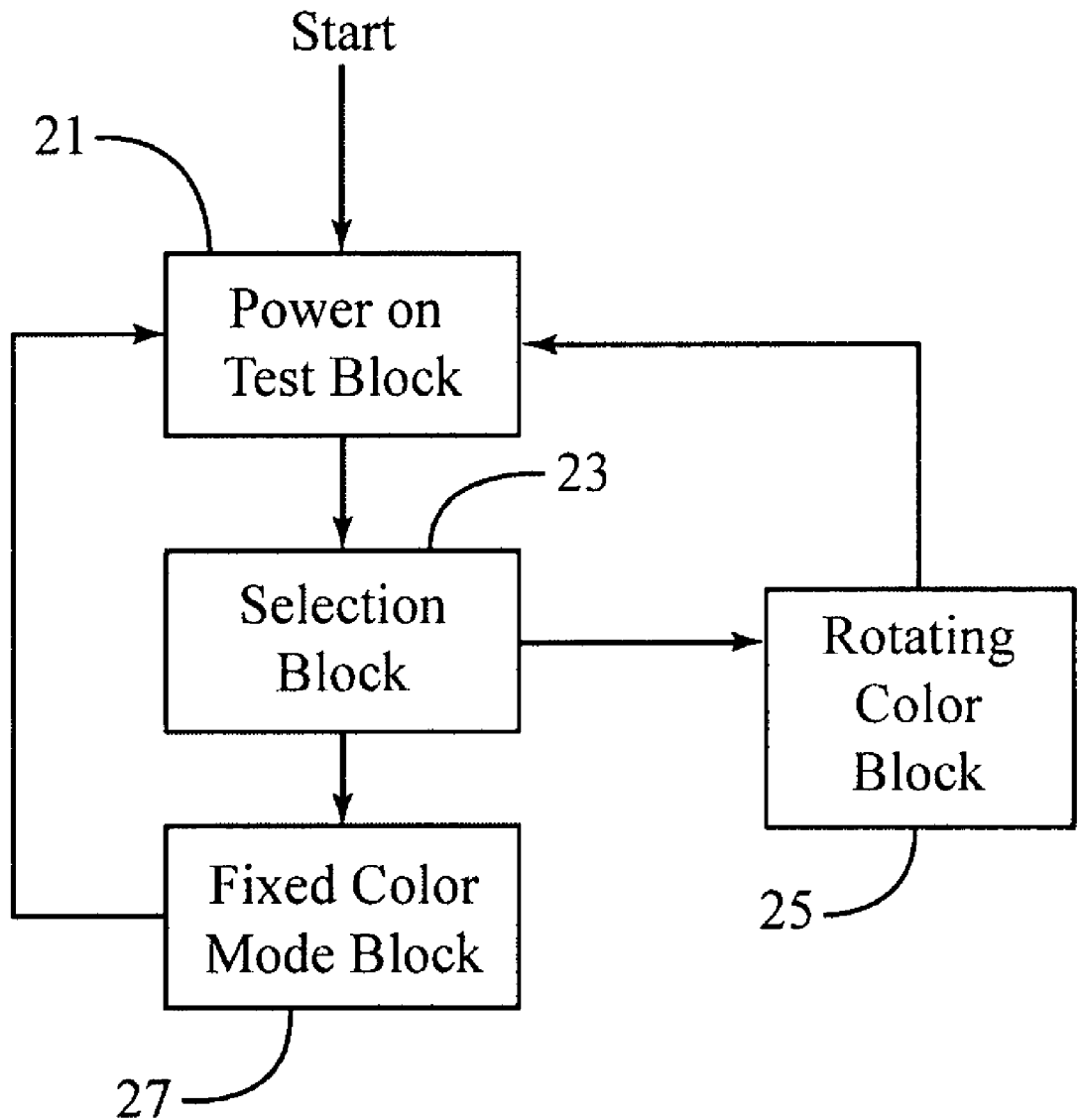
FIG. 5 shows a simple block diagram of the flow of the program in the presented system.

FIG. 5 shows a simple block diagram of the flow of the program in the presented system. Power on test is performed at Block 21. At Block 21, when the power is on for the first time, the first (default) mode LED will blink or flash, and the system goes into synchronize time. At Block 23, during synchronize time a user has the option of switching modes. The selection block 23 checks for the user's selection of the mode for running on the system for a fixed time and accordingly switches to the respective block rotating color mode 25 or block fixed color mode 27. These respective blocks 25 or 27 run the mode until the user interface supplies some other input to return to a subsequent instance of synchronize time. When system is switched off after use, the mode of operation and color or color combinations are stored and the settings are restored until the next restart.

Figure 6:
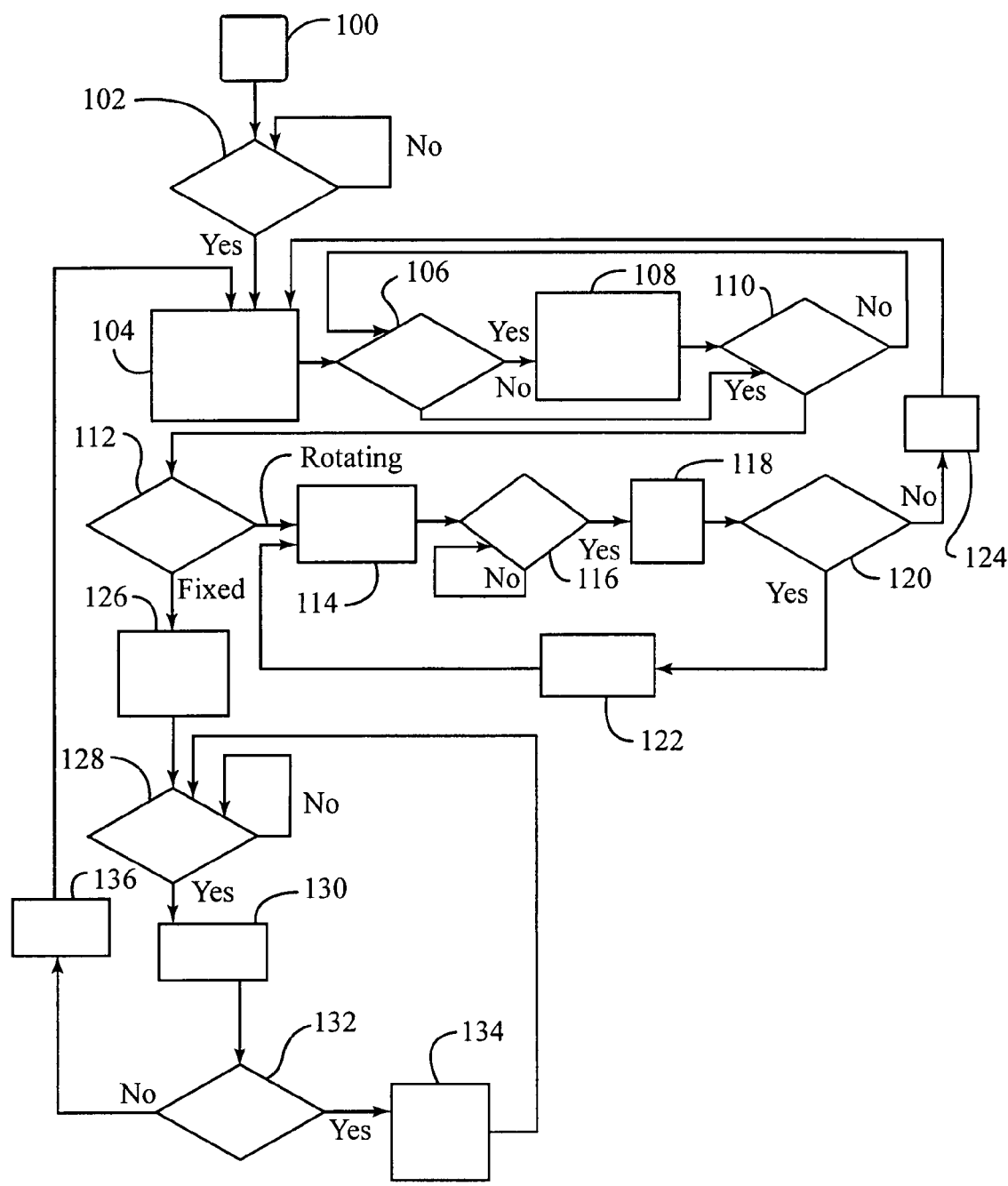
FIGS. 6A-6C show the flow chart of the program work.
Figure 6A:
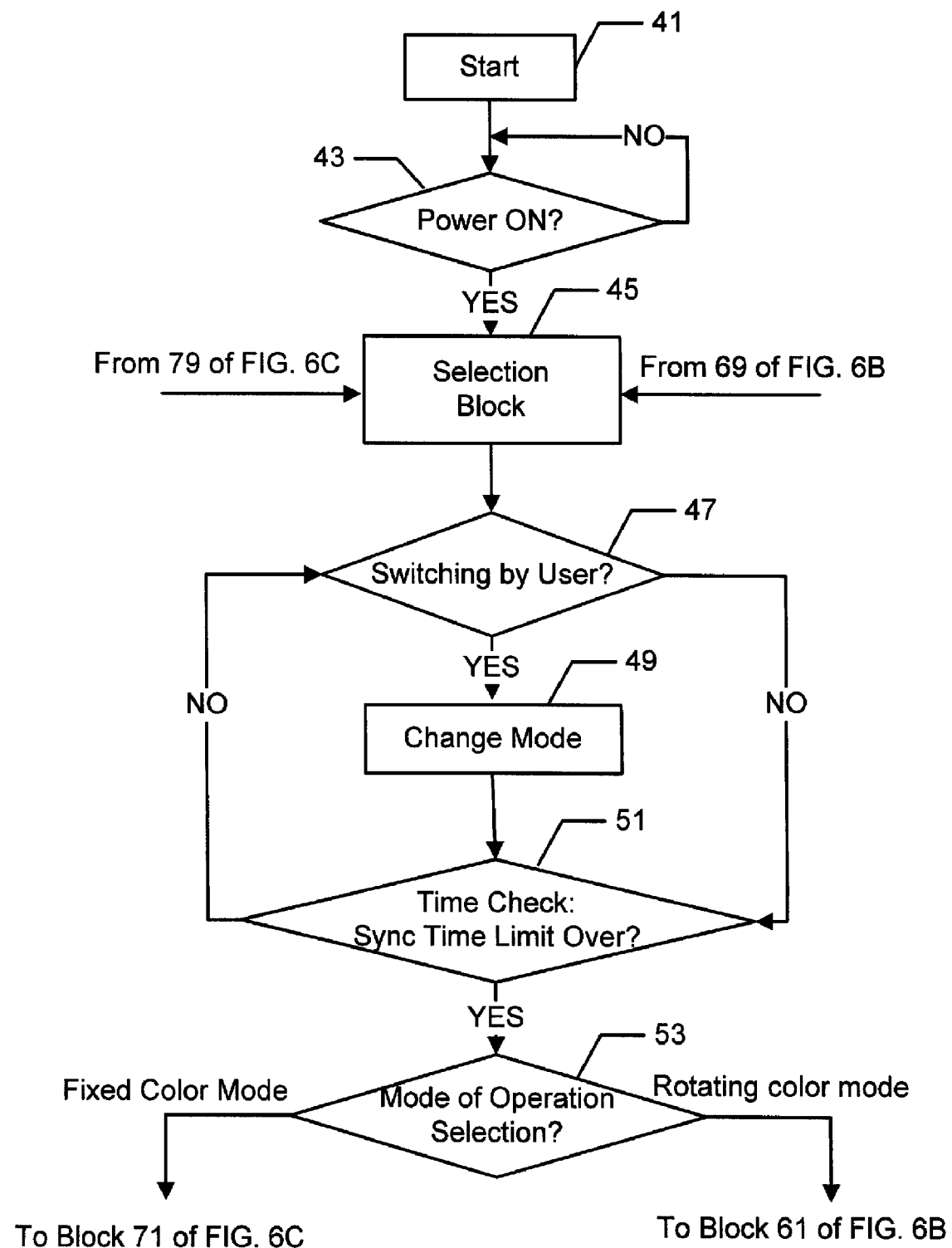
Figures 6B, 6C:
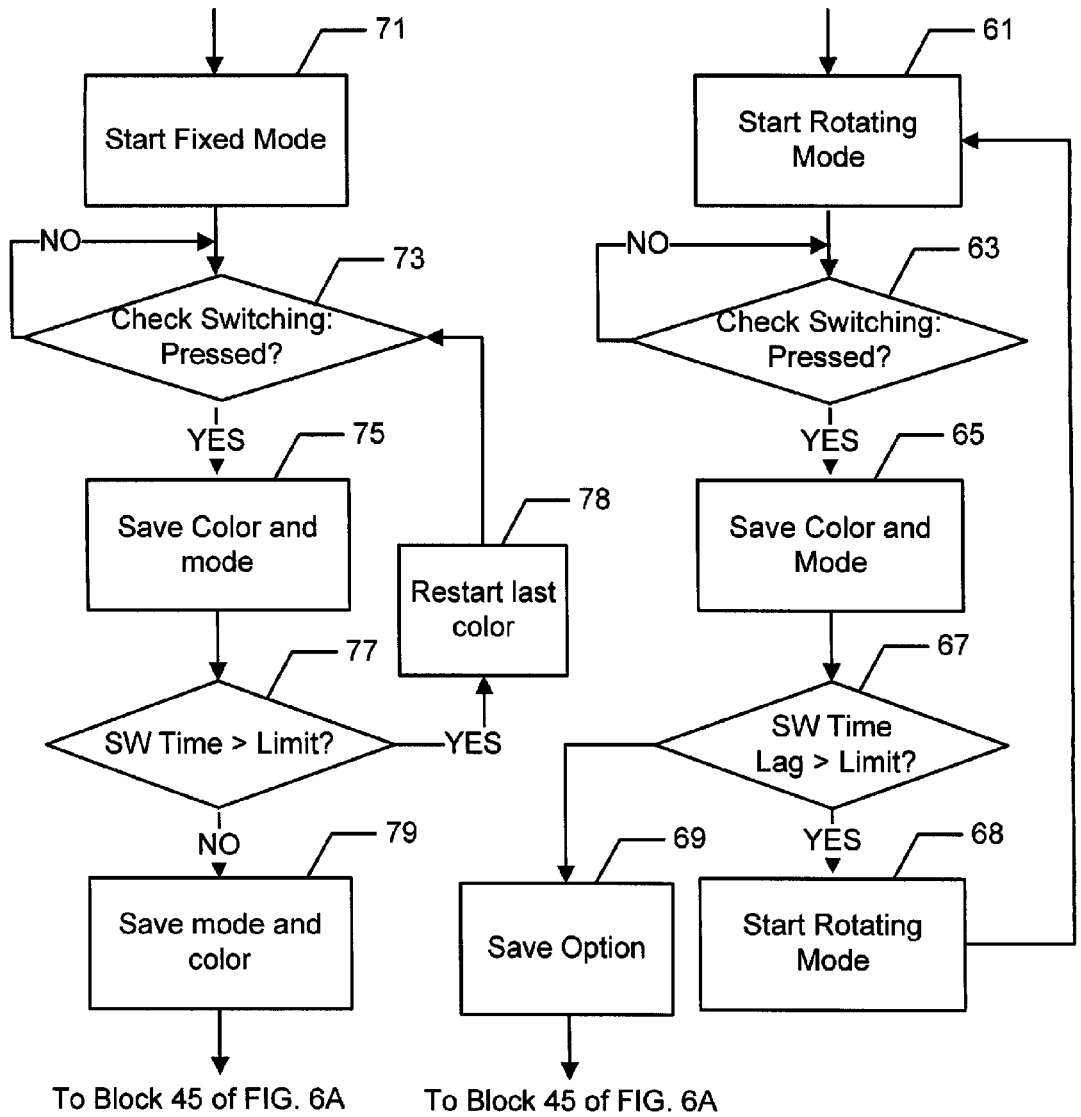

FIGS. 6A-6C show a flow chart of the program of the system. The system starts at block 41, followed by power on test at block 43 and a selection block 45 if system is powered on, these steps of operation are named as "synchronize" or "switching option mode" with a predetermined cycle time. Here, block 47 checks for switching operation by the user. If switching is done, the mode is changed depicted by the block 49, and a time check is performed in block 51, if the predetermined synchronize time limit is not over, the control goes to the block 47 again otherwise a check is performed for mode of operation selection in block 53.

If the mode is set to rotating color, the operation starts with the block 61 and the indicator LED for the mode starts blinking, depicting the rotating color mode of operation. Block 63 checks for the switching operation if switch is pressed control goes to block 65 where the program stores the last color and mode of operation of the system, and in the next control block 67, checks for the time lag of the switching. In the present example, if switching is more than 5 seconds, the system starts at block 68 with the last mode selected and starts at a predetermined position from block 61, otherwise the control goes back to block 45 via block 69 where a save option takes place.

If the mode of operation selected is fixed color mode, the indicator LED for that mode starts indicating the fixed color mode of operation. In this mode, the system starts with a rotating color cycle at block 71, which allows the user to select from the available choices. Block 73 checks for the switching operation. If the switch is pressed, control goes to the next block 75 where the system saves the last color and mode of operation. A check is performed in block 77 to determine if the time between pressing the switch is more than 5 seconds, if it is, the system reinstates the last color position at block 78 and control goes back to block 73. If it is not, control goes to block 79 where the system saves the color and mode of operation and control goes to block 45.

Although the present invention has been described in considerable detail with reference to certain preferred versions thereof, other versions are possible. For example, the present invention can be utilized in other contexts such as military installations or in-house corporate departments without departing from the spirit or intent of the invention. Therefore, the spirit and scope of the appended claims should not be limited to the description of the preferred versions contained herein.

Any element in a claim that does not explicitly state "means for" performing a specific function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

What is claimed is:

1. A method of providing a variable lighting means by selecting a mode and changing colors of a color changing lighting system comprising the steps of:
    (i) providing a power supply for powering the color changing lighting system;
    (ii) providing an inputting means that accepts inputting directives to control the selection of a mode of operation in the color changing lighting system;
    (iii) providing a controller circuit connected to the inputting means to sense the selected mode of operation;
    (iv) providing a drive circuit connected to the power supply and said controller circuit;
    (v) providing a plurality of light emitting diodes connected to the drive circuit;
    (vi) powering on the color changing lighting system to start within a range of a predetermined synchronized time for selecting the mode of operation;
    (vii) selecting the mode of operation using the inputting means and using the plurality of light emitting diodes as indicator lights to provide visual feedback within the range of the predetermined synchronized time by powering the color changing lighting system off and on within a shorter, second predetermined time cycling through different modes while still within the range of the first predetermined synchronized time; wherein,
        (a) the selected mode of operation produces a static light pattern or color by leaving the color changing lighting system on until the predetermined synchronized time is lapsed and then executing either (b) or (c),
        (b) if the selected mode of operation produces a continuous cyclic range of light patterns or colors, powering the color changing lighting system off for more than a predetermined switching time prior to powering the color changing lighting system on to preserve the selected mode of operation and start the color changing lighting system from a predetermined position; and
        (c) if the selected mode of operation produces selectable light patterns or colors, allowing the color cycle to continue until a desired pattern or color is reached, and powering off the color changing lighting system for more than the predetermined switching time before powering the color changing lighting system back on again with the selected pattern or color and preserve the mode of operation;
    (viii) resetting the modes of operation, by powering the color changing lighting system off and on within the predetermined switching time while the color changing lighting system is in any selected mode of operation; and
    (ix) selecting a new mode of operation from a previously selected mode of operation by following step (vii).

2. The method of claim 1, wherein the color changing lighting system is included in a plurality of color changing lighting systems, which are synchronized to illuminate a large area by incorporating them into a common circuit.

3. A method of providing a variable lighting means by selecting a mode and changing colors of a color changing lighting system comprising the steps of:
    (a) powering on the color changing lighting system to start within a range of a predetermined synchronized time for selecting a mode of operation;
    (b) selecting the mode of operation in response to an input from an inputting means and using a plurality of light emitting diodes as indicator lights to provide visual feedback within the range of the predetermined synchronized time by powering the color changing lighting system off and on cycling through different modes while still within the range of the predetermined synchronized time; wherein,
        (i) selected mode of operation produces a static light pattern or color by leaving the color changing lighting system on until the predetermined synchronized time is lapsed and then executing at least one of the following (ii) and (iii),
        (ii) if the selected mode of operation produces a continuous cyclic range of light patterns or colors, powering the color changing lighting system off for more than predetermined switching time prior to powering the color changing lighting system on to preserve the selected mode of operation and start the color changing lighting system from a predetermined position; and
        (iii) if the selected mode of operation produces selectable light patterns or colors, allowing the color cycle to continue until a desired pattern or color is reached, and powering off the color changing lighting system for more than the predetermined switching time before powering the color changing lighting system back on again with the selected pattern or color and preserve the mode of operation;
    (c) resetting the modes of operation, by powering the color changing lighting system off and on within the predetermined switching time while the color changing lighting system is in any selected mode of operation; and
    (d) selecting a new mode of operation from a previously selected mode of operation by following step (b).

* * * * *